(12) United States Patent
Vehvilainen et al.

(10) Patent No.: US 8,492,125 B2
(45) Date of Patent: Jul. 23, 2013

(54) METHOD FOR DISSOLVING CELLULOSE AND A CELLULOSIC PRODUCT OBTAINED FROM A SOLUTION COMPRISING DISSOLVED CELLULOSE

(75) Inventors: Marianna Vehvilainen, Tampere (FI); Pertti Nousiainen, Tampere (FI); Taina Kamppuri, Tampere (FI); Maija Jarventausta, Lempaala (FI)

(73) Assignee: TTY Saatio, Tampere (FR)

( * ) Notice: Subject to any disclaimer, the term of this patent is extended or adjusted under 35 U.S.C. 154(b) by 273 days.

(21) Appl. No.: 12/991,299

(22) PCT Filed: May 6, 2009

(86) PCT No.: PCT/EP2009/055479
§ 371 (c)(1),
(2), (4) Date: Nov. 24, 2010

(87) PCT Pub. No.: WO2009/135875
PCT Pub. Date: Nov. 12, 2009

(65) Prior Publication Data
US 2011/0112286 A1   May 12, 2011

(30) Foreign Application Priority Data
May 6, 2008 (EP) ..................... 08397510

(51) Int. Cl.
*C12P 19/04* (2006.01)
(52) U.S. Cl.
USPC ............. 435/101; 435/96; 435/100; 435/200; 435/209; 536/1.11; 536/4.1; 536/18.5
(58) Field of Classification Search
USPC ............. 435/101, 96, 100, 200, 209; 536/4.1, 536/18.5, 1.11
See application file for complete search history.

(56) References Cited

U.S. PATENT DOCUMENTS

| 5,410,034 A | * 4/1995 | Isogai et al. ................. 536/56 |
| 6,106,763 A | 8/2000 | Struszczyk et al. |

FOREIGN PATENT DOCUMENTS

| CN | 1358769 A | 7/2002 |
| FI | 107335 B | 7/2001 |
| WO | WO 01/96402 A1 | 12/2001 |
| WO | WO 02/22924 A1 | 3/2002 |
| WO | WO 2009/135875 A1 | 11/2009 |

OTHER PUBLICATIONS

Nousiainen et al. in Recent Advanced in Environmentally Compatible Polymers, International Cellucon Conference, 11th, Tsukuba, Japan Mar. 24-26, 1999; publsihed 2001, editor: J. Kennedy (Woodhead Publishing Ltd: Cambridge, UK), pp. 371-378.*
Ghose; "Measurement of Cellulase Activities;" *Pure & Appl. Chem.*; 1987; pp. 257-268; vol. 59, No. 2; Great Britain.
International Search Report dated Sep. 11, 2009 in corresponding International Application No. PCT/EP2009/055479.
May 30, 2012 Chinese Office Action issued in Chinese Patent Application No. 200980116326.8.

* cited by examiner

*Primary Examiner* — Susan Hanley
(74) *Attorney, Agent, or Firm* — Oliff & Berridge, PLC

(57) ABSTRACT

The present invention relates to a method for dissolving cellulose. The method comprises—introducing cellulosic raw material,—treating the cellulosic raw material in an enzymatic treatment process,—mixing the cellulosic raw material after the enzymatic treatment in an aqueous solution in order to obtain an aqueous intermediate product containing the cellulosic raw material of at least 3.5 wt.-%, alkali metal hydroxide between 3.5 wt.-% and 7 wt.-% and zinc salt,—freezing the intermediate product to a solid state, and—melting the frozen intermediate product. The present invention also relates to a cellulosic product obtained from a solution comprising dissolved cellulose.

7 Claims, 2 Drawing Sheets

METHOD FOR DISSOLVING CELLULOSE AND A CELLULOSIC PRODUCT OBTAINED FROM A SOLUTION COMPRISING DISSOLVED CELLULOSE

FIELD OF THE INVENTION

The present invention relates to a method for dissolving cellulose and a cellulosic product obtained from a solution comprising dissolved cellulose.

BACKGROUND OF THE INVENTION

In the prior art, various methods for dissolving cellulose are described. A few publications describe enzymatic treatments in connection with processes for dissolving cellulose.

Publication WO 01/96402 discloses a method in which an enzymatically treated cellulose is dissolved in an aqueous solution of alkali metal hydroxide having a concentration which is not lower than 5 wt.-%. The publication states that the alkaline solutions are stable at temperatures above 0° C. Urea and zinc oxide are applied for the improvement of stability and quality of solutions. The highest reported cellulose concentration in the alkaline solution is 5.2% (NaOH concentration of the alkaline solution containing cellulosic material is 8.57%, see Example 6).

Publication FI 107335 discloses a method in which an enzymatically treated cellulose is dissolved in an aqueous solution of alkali metal hydroxide having a concentration which is from 5 to 15 wt.-%. The publication states that the cellulose concentration may be even 8 wt.-%. However, the following concentrations are reported in the examples of the publication:

| Example | Cellulose concentration (wt.-% in the alkaline hydroxide solution) | The concentration of the alkaline hydroxide solution in wt.-% |
| --- | --- | --- |
| 1 | 3.3 | 9 |
| 2 | 3.3 | 7 |
| 3 | 4.8 | 10 |
| 4 | 6.9 | 9 |
| 5 | 3.3 | 9 |
| 6 | 5 | 9 |
| 7 | 4.5 | 9 |
| 8 | 4.5 | 9 |

Examples 9 to 14 do not contain information on the above-mentioned concentrations. It is reported in examples 1 to 14 that the solubility is quite high. However, the used method is purely visual, and therefore, it is possible that the solution contains insoluble cellulose although it is not detected by the visual method.

The problem with the methods of prior art is that the cellulose content cannot be high if good solubility is expected when the aqueous solution in which the cellulose is dissolved comprises alkali metal hydroxide between 3.5 wt.-% and 7 wt.-%.

SUMMARY OF THE INVENTION

The method of the invention solves the above-mentioned problem. When the aqueous product contains at least 3.5 wt.-% of cellulose and between 3.5 wt.-% and 7 wt.-% of alkali metal hydroxide, the good solubility can be achieved by adding zinc salt and freezing the aqueous intermediate product to a solid state.

There are benefits relating to the invention; for example, the method is environmentally safe and no bleaching of the end products is required. The chemicals which are required in the process are common and inexpensive.

In the method, a cellulosic raw material is introduced. The cellulosic raw material is a fibrous material, such as papermaking pulp or dissolving grade pulp. The degree of the polymerization is usually between 500 and 1200. The cellulosic raw material may be pre-treated mechanically so that at least a portion of the cellulosic raw material is subjected to the mechanical treatment so that the outer surfaces of the fibers are broken at least partially. The mechanical treatment may be accomplished by treating the cellulosic raw material in a wet state (about 20 wt.-% cellulose/80 wt.-% water) in a device arranged to rub and/or to tear the cellulosic raw material. The device may be, for example, a container equipped with rotating arms. The rotating arms may be provided with protrusions which enhance the mechanical treatment. The cellulosic raw material remains between the wall of the container and the rotating arms, and thus, the cellulosic raw material is treated mechanically. However, although the mechanical treatment is preferred, any treatment which breaks and/or opens the structure of the fiber may be used.

The cellulosic raw material, which may have been pre-treated to open the fiber structure is subjected to an enzymatic treatment process. The wet cellulosic raw material is introduced into water to obtain a slurry containing about 5 wt.-% cellulose and 95 wt.-% water. The pH and the temperature of the slurry are adjusted to the desired values, typically to pH 5 and to 50° C. Next, the desired amount of selected endoglucanase-rich cellulase preparation is added with vigorous stirring. The cellulase may have the following activities measured by the IUPAC method (International Union of Pure and Applied Chemistry, 1987, Measurement of cellulose activities, Pure and Applied Chemistry, 59:257-268); endoglucanase acitivity 24 000 nkat/ml, β-glucosidase activity 200 nkat/ml and xylanase activity 9500 nkat/ml. The enzyme dose used is typically 250-500 nkat per 1 g cellulose based on the endoglucanase activity of the preparation. The slurry comprising 5 wt.-% cellulose, 95 wt.-% water and the catalytic amount of cellulase preparation is maintained at pH 5, 50° C. for 3 to 5 hours. Thereafter, the slurry is heated to 80° C. for 10 to 15 minutes to inactivate the enzymes, the water is separated and the pulp is washed with water by using a Büchner funnel in suction filtration. Alternatively, the water may be separated without inactivation of the enzymes, if the pulp is processed under alkaline conditions without delays.

The enzymatic pre-treatment modifies the cellulosic raw material so that its degree of polymerization decreases from 30 to 60 percent compared to the initial degree of polymerization and the shape of the average molecular weight distribution curve becomes more narrow and symmetrical.

It is possible that the mechanical pre-treatment and the enzymatic treatment are combined into a single process step.

After the enzymatic pre-treatment, the enzymatically treated cellulosic raw material is mixed in an aqueous solution which contains alkali metal hydroxide and zinc salt in order to create conditions where the cellulosic raw material can begin to dissolve. The alkali metal hydroxide may be sodium hydroxide, potassium hydroxide, or a mixture of sodium hydroxide and potassium hydroxide. Sodium hydroxide is the preferred alkali metal hydroxide. The concentration of the alkali metal hydroxide, such as sodium hydroxide, may vary between 3.5 and 7 wt.-% of the total weight of the aqueous slurry containing the cellulosic raw material. The end limits of the range, namely 3.5 wt.-% and 7 wt.-%, may belong to the range but it is also possible that the lower limit may be higher than 3.5 wt.-% and the upper limit may be lower than 7 wt.-%. Usually, the lower limit is at least 4.5 wt.-%, or the lower limit is higher than 4.5 wt.-%. The upper limit is usually not higher than 6.5 wt.-%, or the upper limit is lower than 6.5 wt.-%. All in all, it is better that the alkali hydroxide concentration is as low as possible, provided that the desired solubility of the cellulose has been achieved.

In order to reach the lowest reasonable alkali hydroxide concentration (from the solubility point of view), zinc salt should be added to the aqueous solution. The zinc salt may be, for example, zinc oxide, zinc chloride, or a mixture of zinc salts. The preferred zinc salt is zinc oxide. The amount of the zinc salt, such as zinc oxide, may vary between 0.1 and 3.3 wt.-%. The end limits of the range, namely 0.1 wt.-% and 3.3 wt.-%, may belong to the range but it is also possible that the lower limit may be higher than 0.1 wt.-% and the upper limit may be lower than 3.3 wt.-%. Usually, the lower limit is at least or higher than 0.5 wt.-%. The upper limit is usually not higher than or lower than 1.5 wt.-%. However, the alkali metal hydroxide concentration and the zinc salt concentration are dependent on each other; when there is a high alkali metal hydroxide concentration, less zinc salt is required. For example, 0.5 wt.-% of zinc salt is an adequate amount to enhance solubility in an alkali metal hydroxide solution whose concentration is 6.5 wt.-%. On the other hand, when the alkali metal hydroxide concentration is 4 wt.-%, 1.3 wt.-% is required in order to enhance the solubility. Therefore, the amount of the alkali metal hydroxide and the zinc salt should be adjusted in a stepless manner inside their above determined ranges so that optimum results can be reached. The target cellulose concentration of the solution depends on the end use of the solution. For the production of cellulosic fibres, the target cellulose concentration is at least 5.0 wt.-% (calculated as a dry mass). Naturally, lower concentrations are also possible and there are not technical limitations to produce such solutions.

As already mentioned above, the alkali metal hydroxide concentration and the zinc salt concentration are dependent on each other in respect of the efficiency to dissolve cellulose. However, they are also dependent on each other in another manner because there is a maximum zinc salt amount which is soluble in the alkali metal hydroxide solution having a certain concentration. For example, when the alkali metal hydroxide concentration is 3 wt.-%, the maximum amount of zinc oxide which is soluble in the solution is about 1.4 wt.-%. When the alkali metal hydroxide concentration is 3.5 wt.-%, 4 wt.-% and 4.5 wt.-%, the maximum amount of zinc oxide is about 1.6 wt.-%, 1.8 wt.-% and 2.1 wt.-%, respectively.

After the cellulosic raw material has been mixed with the aqueous solution, the obtained intermediate product is frozen so that the product becomes solid. Before the subzero treatment the intermediate product is a slurry or a dispersion which contains undissolved cellulose. The temperature required for freezing depends on the alkali metal hydroxide concentration of the intermediate product. For example, when the alkali metal hydroxide concentration is 5.5 wt.-%, the product freezes at a temperature of about −5° C. When the alkali metal hydroxide concentration is 7 wt.-%, the product freezes at a temperature of about −6.7° C. Therefore, the minimum freezing temperature is dependent on the alkali metal hydroxide concentration of the product. Before producing end products from the frozen product it is melted. Due to melting the cellulose dissolves, the solution is clear and it does not contain any insoluble portions when it is studied microscopically and thus, it is ready for further processing. The solution may be frozen several times without affecting its properties.

The solution is useful in manufacturing, for example, of fibers, films, or granulates. The viscosity of the solution may vary due to the parameters used (cellulose concentration, alkali concentration, zinc concentration) and therefore, some parameters may be more beneficial to be used in connection with certain products.

BRIEF DESCRIPTION OF THE DRAWINGS

In the following, the invention will be described by an example and referring to drawings in which.

DETAILED ESCRIPTION OF THE INVENTION

EXAMPLE

Figures 1A, 1B, 1C, 1D:
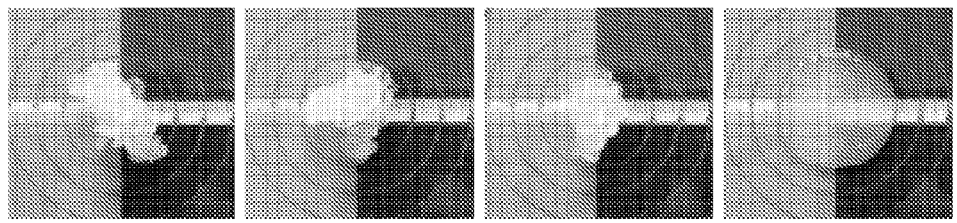
FIG. 1a shows a sample containing 6.0 wt.-% of cellulose, 4.0 wt.-% of sodium hydroxide (NaOH) and 0 wt.-% of zinc oxide.
FIG. 1b shows a sample containing 6.0 wt.-% of cellulose, 4.0 wt.-% of sodium hydroxide (NaOH) and 0.5 wt.-% of zinc oxide.
FIG. 1c shows a sample containing 6.0 wt.-% of cellulose, 4.0 wt.-% of sodium hydroxide (NaOH) and 0.84 wt.-% of zinc oxide.
FIG. 1d shows a sample containing 6.1 wt.-% of cellulose, 4.0 wt.-% of sodium hydroxide (NaOH) and 1.3 wt.-% of zinc oxide.
Figures 2A, 2B, 2C, 2D:
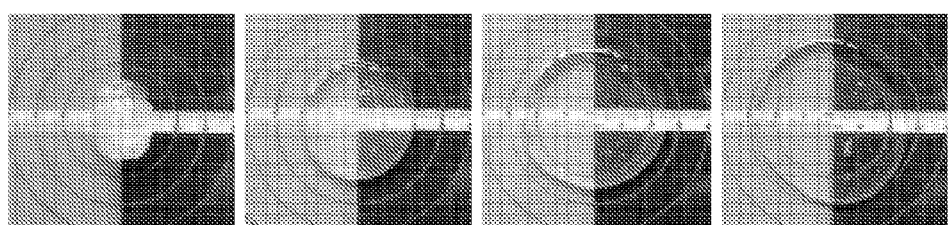
FIG. 2a shows a sample containing 5.9 wt.-% of cellulose, 5.5 wt.-% of sodium hydroxide (NaOH) and 0 wt.-% of zinc oxide.
FIG. 2b shows a sample containing 5.9 wt.-% of cellulose, 5.5 wt.-% of sodium hydroxide (NaOH) and 0.5 wt.-% of zinc oxide.
FIG. 2c shows a sample containing 6.0 wt.-% of cellulose, 5.5 wt.-% of sodium hydroxide (NaOH) and 0.84 wt.-% of zinc oxide.
FIG. 2d shows a sample containing 5.9 wt.-% of cellulose 5.5 wt.-% of sodium hydroxide (NaOH) and 1.3 wt.-% of zinc oxide.
Figures 3A, 3B, 3C, 3D:
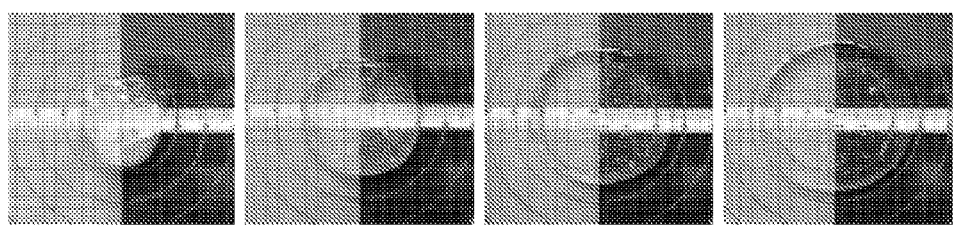
FIG. 3a shows a sample containing 5.8 wt.-% of cellulose, 6.0 wt.-% of sodium hydroxide (NaOH) and 0 wt.-% of zinc oxide.
FIG. 3b shows a sample containing 5.9 wt.-% of cellulose, 6.0 wt.-% of sodium hydroxide (NaOH) and 0.5 wt.-% of zinc oxide.
FIG. 3c shows a sample containing 6.1 wt.-% of cellulose, 6.0 wt.-% of sodium hydroxide (NaOH) and 0.84 wt.-% of zinc oxide.
FIG. 3d shows a sample containing 5.9 wt.-% of cellulose, 6.0 wt.-% of sodium hydroxide (NaOH) and 1.3 wt.-% of zinc oxide.
Figures 4A, 4B, 4C, 4D:
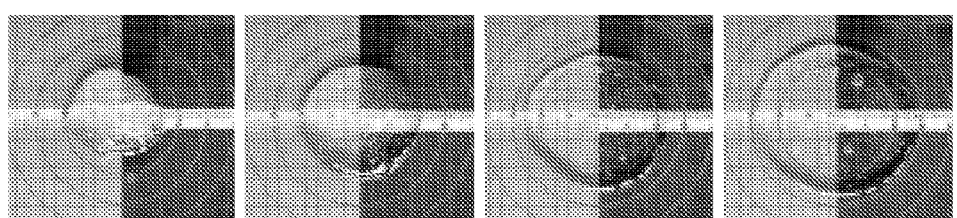
FIG. 4a shows a sample containing 5.8 wt.-% of cellulose, 6.5 wt.-% of sodium hydroxide (NaOH) and 0 wt.-% of zinc oxide.
FIG. 4b shows a sample containing 5.9 wt.-% of cellulose, 6.5 wt.-% of sodium hydroxide (NaOH) and 0.5 wt.-% of zinc oxide.
FIG. 4c shows a sample containing 6.0 wt.-% of cellulose, 6.5 wt.-% of sodium hydroxide (NaOH) and 0.84 wt.-% of zinc oxide.
FIG. 4d shows a sample containing 5.7 wt.-% of cellulose, 6.5 wt.-% of sodium hydroxide (NaOH) and 1.3 wt.-% of zinc oxide.
Figures 5A, 5B, 5C, 5D:
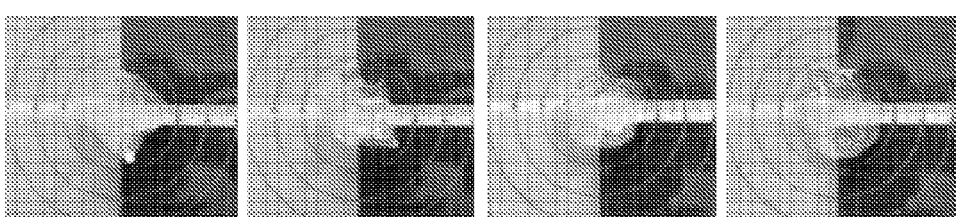
FIG. 5a shows a sample containing 6.0 wt.-% of cellulose, 7.0 wt.-% of sodium hydroxide (NaOH) and 0 wt.-% of zinc oxide.
FIG. 5b shows a sample containing 6.0 wt.-% of cellulose, 7.0 wt.-% of sodium hydroxide (NaOH) and 0.5 wt.-% of zinc oxide.
FIG. 5c shows a sample containing 5.9 wt.-% of cellulose, 7.0 wt.-% of sodium hydroxide (NaOH) and 0.84 wt.-% of zinc oxide.
FIG. 5d shows a sample containing 6.0 wt.-% of cellulose, 7.0 wt.-% of sodium hydroxide (NaOH) and 1.3 wt.-% of zinc oxide.

Samples of enzymatically treated cellulosic raw material were prepared in a laboratory scale. First, a desired amount of a dry cellulosic raw material was weighed and added into water by stirring in order to obtain an aqueous stock. The stirring conditions should be: the stirring speed may vary between 700 and 1000 rpm, the stirring time of 5 minutes is adequate. Additional water was added to the stock at the end of the stirring and the stock was kept in a refrigerator over night.

Next, water was separated from the cellulosic raw material by using a Büchner funnel in a suction filtration so that the water content of the cellulosic raw material was adjusted to be applicable to the next step. The amount of the cellulosic raw material in water was adjusted to 15 wt.-%.

A solution comprising water, alkali metal hydroxide (NaOH) and zinc salt (ZnO) was prepared. In practice, sodium zincate solutions were prepared by diluting the stock solution containing 570 g/l NaOH and 266 g/l ZnO. The obtained solution was added at room temperature to an aqueous cellulosic raw material so that the amount of the cellulosic raw material of the total weight of the sample was 6 wt.-%. The sample was frozen at a temperature of −35° C. and melted at a temperature of +10° C.

Twenty samples were prepared in the above-mentioned manner. The concentration of the alkali metal hydroxide and the zinc salt varied in the samples (Table 1). The viscosity of the obtained solution was measured using the modified Ball-Drop Method (ASTM D 1343-86) using stainless steel balls (1/8", 130 mg) and a measuring distance of 20 cm. The measurement was carried out at the ambient temperature (20±1° C.). Viscosity values of the samples are given in the Table 1 and illustrations of the samples (of 5 g each) on glass plate with measuring tape (mm) in FIGS. 1a to 5d.

TABLE 1

| Sample | Cellulose, wt.-% | NaOH, wt.-% | ZnO, wt.-% | Viscosity, s |
|---|---|---|---|---|
| 1a | 6.0 | 4.0 | 0.00 | — |
| 1b | 6.0 | 4.0 | 0.50 | — |
| 1c | 6.0 | 4.0 | 0.84 | — |
| 1d | 6.1 | 4.0 | 1.30 | — |
| 2a | 5.9 | 5.5 | 0.00 | — |
| 2b | 5.9 | 5.5 | 0.50 | — |
| 2c | 6.0 | 5.5 | 0.84 | 128 |
| 2d | 5.9 | 5.5 | 1.30 | 74 |
| 3a | 5.8 | 6.0 | 0.00 | — |
| 3b | 5.9 | 6.0 | 0.50 | — |
| 3c | 6.1 | 6.0 | 0.84 | 274 |
| 3d | 5.9 | 6.0 | 1.30 | 62 |
| 4a | 5.8 | 6.5 | 0.00 | — |
| 4b | 5.9 | 6.5 | 0.50 | — |
| 4c | 6.0 | 6.5 | 0.84 | 492 |
| 4d | 5.7 | 6.5 | 1.30 | 72 |
| 5a | 6.0 | 7.0 | 0.00 | — |
| 5b | 6.0 | 7.0 | 0.50 | — |
| 5c | 5.9 | 7.0 | 0.84 | — |
| 5d | 6.0 | 7.0 | 1.30 | — |

As one can see from the samples, their viscosity varied to a great extent. The cellulosic raw material in the samples which do not contain zinc oxide does not dissolve properly. The best results were obtained when the zinc oxide content was at least 0.5 wt.-% and the alkali hydroxide concentration was between 5.5 wt.-% and 6.5 wt.-%.

The solutions whose viscosity is on a proper level (below 100 s) may be used to manufacture fibers. The solution is spun through a spinneret to a spinning bath where the fibers are coagulated. The spinning bath may comprise sulphuric acid, sodium sulphate and water.

Figure 6:
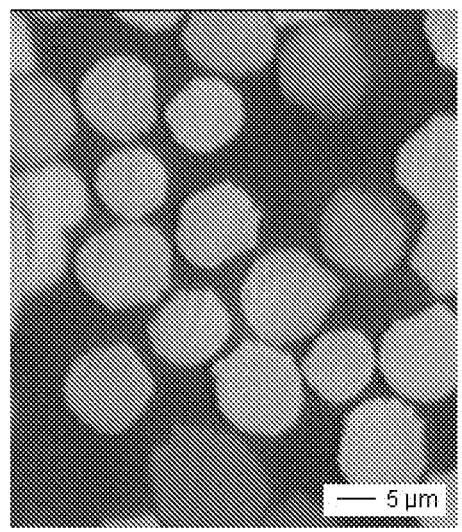
FIG. 6 shows a cross-sectional view of cellulosic fibers spun from a solution comprising 6.0 wt.-% of cellulose, 6.5 wt.-% of sodium hydroxide (NaOH) and 1.3 wt.-% of zinc oxide (ZnO).

FIG. 6 shows a cross-sectional view of cellulosic fibers spun from a solution comprising 6.0 wt.-% of cellulose, 6.5 wt.-% of sodium hydroxide (NaOH) and 1.3 wt.-% of zinc oxide (ZnO). As one can see from FIG. 6, the cellulosic fibers has a round cross-section so that their cross-section is clearly distinguishable from that of the viscose fibers.

The invention claimed is:

1. A method for dissolving cellulose, the method comprising:
   providing a cellulosic raw material,
   subjecting the cellulosic raw material to an enzymatic treatment process by contacting the cellulosic raw material with a cellulase preparation comprising at least one endoglucanase,
   mixing the cellulosic raw material after the enzymatic treatment with an aqueous solution, an alkali metal hydroxide and a zinc salt in order to obtain an aqueous intermediate product containing the cellulosic raw material of at least 3.5 wt.-%, the alkali metal hydroxide between 3.5 wt.-% and 7 wt.-% and the zinc salt, the aqueous intermediate being a slurry or dispersion containing undissolved cellulose,
   freezing the aqueous intermediate product to a solid state at a subzero temperature dependent on the alkali metal hydroxide concentration of the aqueous intermediate product, and
   melting the resultant frozen solid state intermediate product and causing the undissolved cellulose to dissolve due to melting.

2. The method according to claim 1, wherein the aqueous intermediate product comprises alkali metal hydroxide between 4.5 wt.-% and 6.5wt.-%.

3. The method according to claim 2, wherein the alkali metal hydroxide is sodium hydroxide.

4. The method according to claim 1, wherein the aqueous intermediate product comprises zinc salt between 0.5 wt.-% and 1.5 wt.-%.

5. The method according to claim 4, wherein the zinc salt is zinc oxide.

6. The method according to claim 1, wherein the cellulosic raw material is pre-treated to open the fiber structure before the enzymatic treatment process.

7. The method according to claim 1, wherein the enzymatically treated cellulosic raw material is mixed with the aqueous solution at room temperature.

* * * * *